United States Patent
Dalvi et al.

(10) Patent No.: US 10,235,112 B2
(45) Date of Patent: Mar. 19, 2019

(54) HOT FOLDER CREATION AND MANAGEMENT

(71) Applicant: Konica Minolta Laboratory U.S.A., Inc., San Mateo, CA (US)

(72) Inventors: Sanjay Dalvi, Campbell, CA (US); Hidetaka Yoshida, Foster City, CA (US); Ryoichi Yokoohji, San Mateo, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 15/475,872

(22) Filed: Mar. 31, 2017

(65) Prior Publication Data

US 2018/0285031 A1    Oct. 4, 2018

(51) Int. Cl.
*G06F 3/12* (2006.01)

(52) U.S. Cl.
CPC ............ *G06F 3/127* (2013.01); *G06F 3/1206* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 2005/0073717 A1* | 4/2005 | Arakawa | G06F 3/1204 358/1.15 |
| 2010/0225963 A1* | 9/2010 | Kuroshima | G06F 3/1208 358/1.15 |
| 2010/0315661 A1 | 12/2010 | Sato | |
| 2011/0235128 A1* | 9/2011 | Sisco | H04N 1/32133 358/3.28 |
| 2013/0308158 A1* | 11/2013 | Morita | H04N 1/00095 358/1.15 |
| 2016/0004495 A1* | 1/2016 | Akamine | H04N 1/00912 358/1.15 |

* cited by examiner

Primary Examiner — Fan Zhang
(74) Attorney, Agent, or Firm — Osha Liang LLP

(57) ABSTRACT

A method for creating local hot folders is provided. The method includes: receiving, by a print server that includes a first network hot folder and a second network hot folder, a request to create at least one local hot folder on a user computing device; determining, by the print server, that the request corresponds to the first network hot folder; and transmitting, by the print server to the user computing device, a first instruction set comprising an instruction to create a first local hot folder that implements a first transfer protocol. The first network hot folder executes a predetermined process and requires the first transfer protocol in response to executing the predetermined process, and the second network hot folder executes another process and requires a second transfer protocol.

16 Claims, 15 Drawing Sheets

Client's desktop

HOT FOLDER CREATION AND MANAGEMENT

BACKGROUND

A "hot folder" is generally known as a folder (i.e., storage space) installed with a specific application or set of applications. Each hot folder created on a server may be configured to execute specific processes or functions of the application on a compatible file that is placed in the hot folder. Authenticated users with permission to access the server through a network connection may create a link to a hot folder stored on the server in the form of a local folder on the user's device. A compatible file that is placed in the local folder will be transmitted from the user's device to the corresponding hot folder where the file will be processed by the server.

SUMMARY

In general, in one aspect, the invention relates to a method for creating local hot folders. The method comprises: receiving, by a print server comprising a first network hot folder and a second network hot folder, a request to create at least one local hot folder on a user computing device, wherein the first network hot folder executes a predetermined process and requires a first transfer protocol in response to executing the predetermined process, and the second network hot folder executes another process and requires a second transfer protocol; determining, by the print server, that the request corresponds to the first network hot folder; and transmitting, by the print server to the user computing device, a first instruction set comprising an instruction to create a first local hot folder that implements the first transfer protocol.

In general, in one aspect, the invention relates to a non-transitory computer-readable medium (CRM) storing instructions that causes a print server to perform an operation to create hot folders on a user computing device. The operation comprises: receiving, by the print server, a request to create at least one local hot folder on the user computing device, wherein the print server comprises a first network hot folder and a second network hot folder, the first network hot folder executes a predetermined process and requires a first transfer protocol in response to executing the predetermined process, and the second network hot folder executes another process and requires a second transfer protocol; determining, by the print server, that the request corresponds to the first network hot folder; and transmitting, by the print server to the user computing device, a first instruction set comprising an instruction to create a first local hot folder that implements the first transfer protocol.

In general, in one aspect, the invention relates to a system for printing. The system comprises: a print server that comprises a processor coupled to a memory, wherein the memory comprises a first network hot folder and a second network hot folder, the first network hot folder executes a predetermined process and requires a first transfer protocol in response to executing the predetermined process, and the second network hot folder executes another process and requires a second transfer protocol; and a user computing device connected to the print server. The print server: receives, from the user computing device a request to create at least one local hot folder on the user computing device, determines that the request corresponds to the first network hot folder, and transmits, to the user computing device, a first instruction set comprising an instruction to create a first local hot folder that implements the first transfer protocol.

Other aspects of the invention will be apparent from the following description and the appended claims.

DETAILED DESCRIPTION

Figure 1:
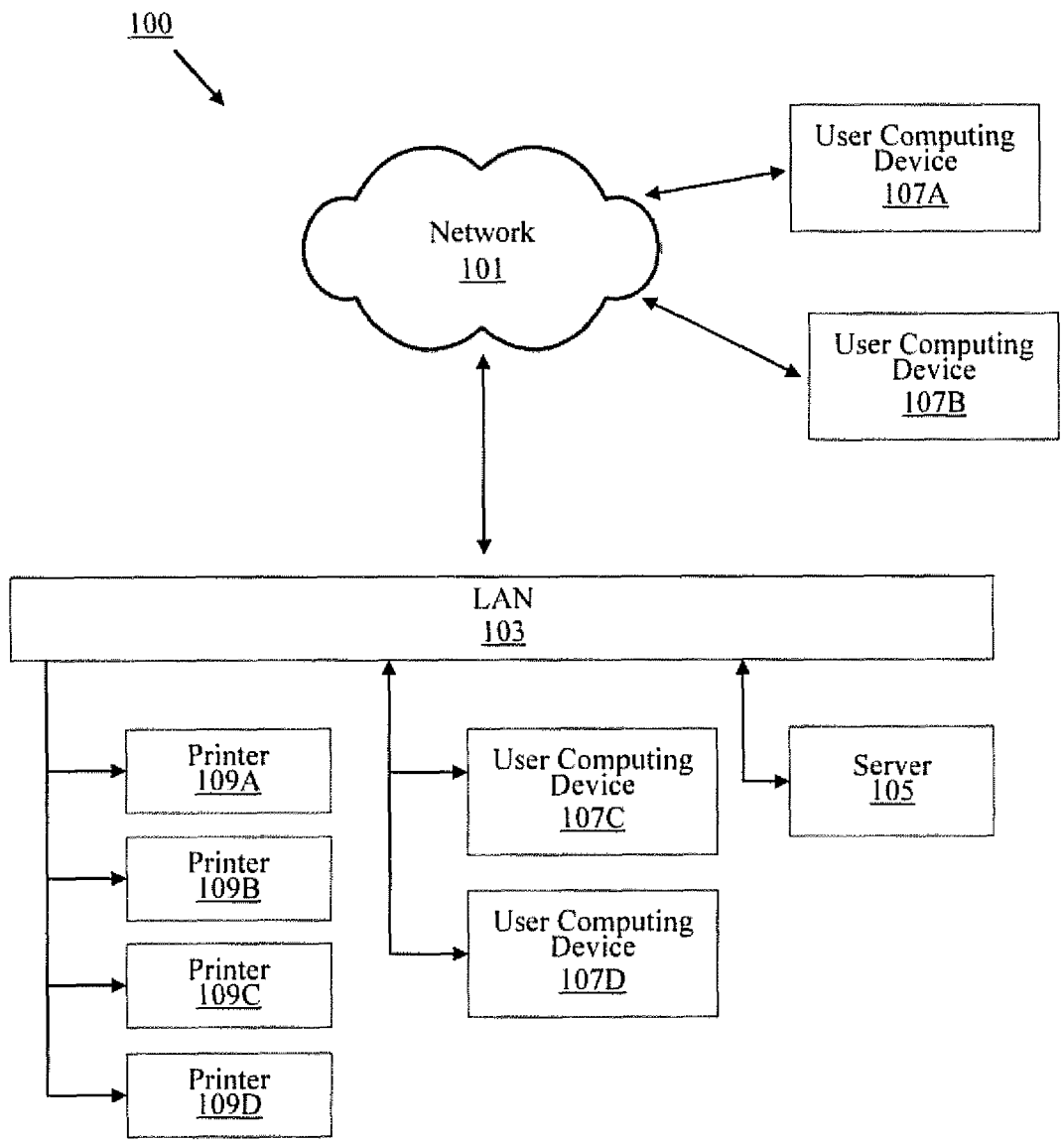
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In general, one or more embodiments of the invention provide a method, a non-transitory computer readable medium, and a system configured for creating and managing hot holders. According to one or more embodiments, a hot folder on a user computing device (herein referred to as "a local hot folder") that is linked to a hot folder stored on a server (herein referred to as "a network hot folder) can be automatically created. The local hot folder transfers a file (i.e., a print job) between a user computing device, a print server executing a print management application (i.e., a print manager), and a printer, and may be automatically created by way of a GUI (graphical user interface) window on the user computing device. Based on the processes associated with or to be executed by a particular network hot folder, a first transfer method (herein referred to as "first transfer protocol") or a second transfer method (herein referred to as "second transfer protocol") may be selected to transfer the print job from the user computing device to the printer. The transfer of the print job between the user computing device and the print server may involve the user computing device sending the print job to the print server through the local hot folder (i.e., a push-type hot folder) or the print manager fetching the print job from the local hot folder (i.e., a pull-type hot folder). The print manager may execute a monitoring service on the user computing device connected to the server to monitor a local hot folder that is linked to a network hot folder.

FIG. 1 shows a system (100) in accordance with one or more embodiments of the invention. As shown in FIG. 1, the system (100) includes a network (101), a local area network (103) (LAN) connected to the network (101), a server (105), multiple user computing devices (107A-107D), and multiple printers (109A-109D). Each user computing device (107A-107D) may correspond to a personal computer (PC), a laptop, a mobile computing device (e.g., tablet PC, smartphone, etc.), a server, a mainframe, a kiosk, etc. The user computing devices (107A-107D), the server (105), and the printers (109A-109D) are connected to each other through the network (101) and LAN (103) using wired and/or wireless connections.

In one or more embodiments, the network (101) may be the Internet. The LAN (103) may be a wired/wireless router, modem device, or a combination of both devices with access to the network (101).

In one or more embodiments, the server (105) may be an application proxy server (APS) configured as a print server that stores and executes a printing application. The server (105) (herein referred to as "print server") is a physical and/or virtual computing infrastructure that performs application and information processing. For example, the print server (105) may be a virtual server or a physical server accessed remotely via the network (101). The print server (105) is configured to receive or fetch a print job from the user computing devices (107A-107D).

In one or more embodiments of the invention, each user computing device (107A-107B) is operated by a different user (e.g., individual, company, etc.) and is configured to issue the print job in a form specific to the user. Accordingly, the print jobs issued by different users may be associated with different file formats that include page-description language (PDL) data for multiple print settings/features (e.g., number of copies, stapling, two-sided printing, etc.). Example formats include DOC, DOCX, XLSX, PDF, PPT, XML, etc., and even these formats may be customized between users.

In one or more embodiments, the printers (109A-109D) may be operated by the same or different users of the user computing devices (107A-107D). The printers (109A-109D) may be multi-function peripherals (MFPs) with functions such as printing, scanning, copying, faxing, emailing, etc., and these functions can be customized by the users. The printers (109A-109D) are configured to receive the print job issued by the user computing devices (107A-107B) from the print server (105).

Figure 2:
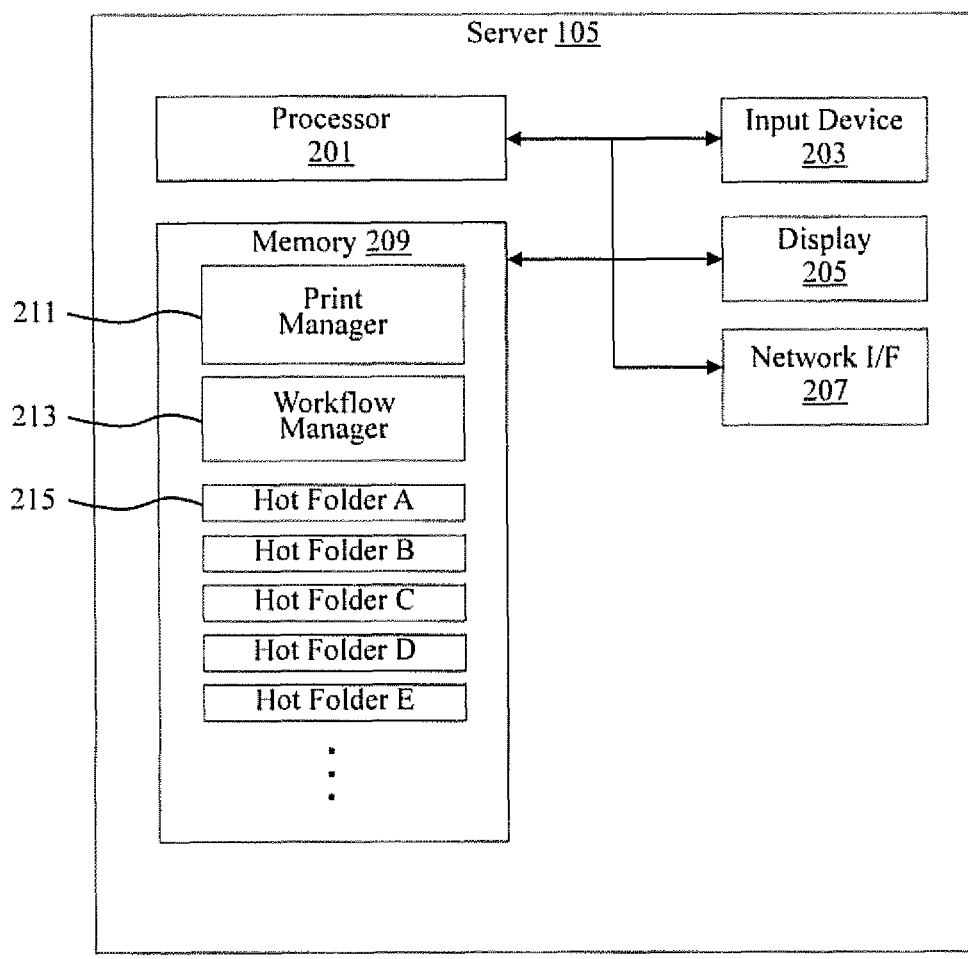
FIG. 2 shows a diagram in accordance with one or more embodiments of the invention.

FIG. 2 shows a diagram of the print server (105) as discussed above in reference to FIG. 1, in accordance with one or more embodiments. In the example shown in FIG. 2, the server (105) includes a processor (201) (e.g., a central processing unit), an input device (203) (e.g., keyboard, mouse, etc.), a display (205), a network interface (network I/F) (207), and a memory (209). In one or more embodiments, network I/F (207) is configured to connect the print server (105) to the network (101). The memory (209) may be an internal memory (e.g., random access memory (RAM), cache memory, flash memory, etc.). Alternatively, the memory (209) may be an external memory (e.g., a hard disk, an optical drive such as a compact disk (CD) drive or digital versatile disk (DVD) drive, a flash memory stick, etc.).

In one or more embodiments as shown in FIG. 2, the memory (209) is configured to store the print manager (211), a workflow manager (213), and multiple network hot folders (215). In one or more embodiments, the print manager (211) and the workflow manager (213) may be implemented in hardware (i.e., circuitry), software, or any combination of hardware and software. The print manager (211) is executed in conjunction with the workflow manager (213) by the processor (201). The print manager (211) is configured to monitor the network hot folders (215) and transmit any print jobs stored in the network hot folders (215) to be executed by the printers (109A-109D), which were discussed above in reference to FIG. 1. The workflow manager (213) is configured to control and streamline the print job transfer and print job processing by the processor (201).

In one or more embodiments, the print manager (211) is also configured to monitor the local hot folders created on the user computing devices (107A-107D). When the print manager (211) determines that a print job is placed into or stored in the local hot folders, the print manager (211) may fetch the print job from the local hot folders to the server (105).

In one or more embodiments, in addition to monitoring the network and local hot folders, the print manager (211) is configured to receive and process a request transmitted from the user computing devices (107A-107D) to create a local hot folder. Upon receiving the request, the print manager (211) transfers an instruction set (i.e., which may contain one or more instructions) from the server (105) to the user computing devices (107A-107D) to instruct the user computing devices (107A-107D) to create the requested local hot folder. The instruction set may include one or more instructions to create either a push-type or pull-type local hot folder that implements either a first or second transfer protocol, which will be discussed below in reference to FIGS. 7A, 7B, 8A, and 8B.

In one or more embodiments, each of the network hot folders (215) is configured to execute different sets of printing processes that correspond to different print settings/features. Each of the network hot folders (215) is created with a unique folder name so that no two network hot folders (215) share the same folder name. For example, the network hot folders (215) may be named using a combination of the word "Hot Folder" and an alphabet. Alternatively, the network hot folders (215) can be created with any combination of words, letters, symbols, numbers, etc.

Figure 3:
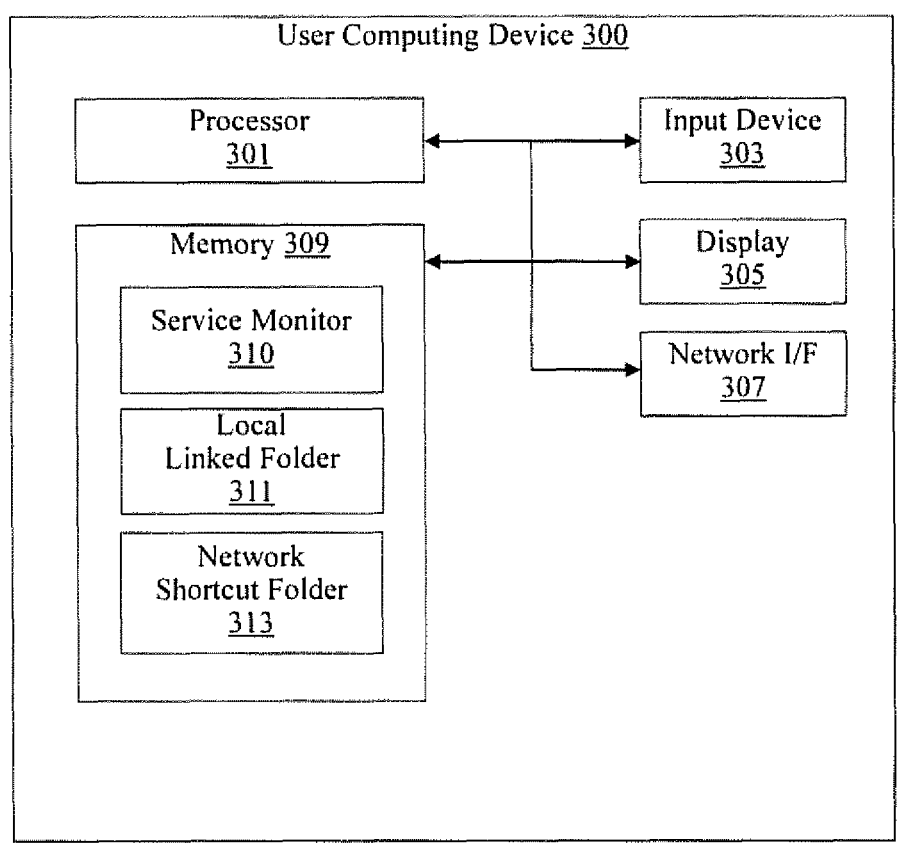
FIG. 3 shows a user interface in accordance with one or more embodiments of the invention.

FIG. 3 shows a diagram in accordance with one or more embodiments of the invention. More specifically, FIG. 3 shows a diagram of a user computing device (300), which can be any one of the multiple user computing devices (107A-107D) as discussed above in reference to FIG. 1. As shown in FIG. 3, the user computing device (300) includes a processor (301) (e.g., a central processing unit), an input device (303) (e.g., keyboard, mouse, etc.), a display (305), a network interface (network I/F) (307), and a memory (309). In one or more embodiments, network I/F (307) is configured to connect the user computing device (300) to the network (101). The memory (309) may be an internal memory (e.g., random access memory (RAM), cache memory, flash memory, etc.). Alternatively, the memory (309) may be an external memory (e.g., a hard disk, an optical drive such as a compact disk (CD) drive or digital versatile disk (DVD) drive, a flash memory stick, etc.).

In one or more embodiments as shown in FIG. 3, the memory (309) is configured to store a service monitor (310), and two types of local hot folders: local linked folder (311), and network shortcut folder (313). In one or more embodiments, multiple local hot folders (311) and network hot folder shortcuts (313) may be stored in the memory (309) depending on the number of local hot folders created by the user.

In one or more embodiments, the service monitor (310) may be an extension of the print manager (211) installed on the print server (105). The service monitor (310) may be downloaded to the user computing device (300) as from the print server (105) through a website associated with a vendor operating the print server (105) or from a CD, DVD, flash memory stick or the like provided by the vendor. The service monitor (310) is installed on the user computing device (300) as an independent service running on the user computing device (300). The service monitor (310) may be executed by the processor (301) only when a connection between the user computing device (300) and the print server (105) is established. In one or more embodiments, the service monitor (310) monitors the local linked folder (311). When the service monitor (310) determines that a print job is placed into or stored in the local linked folder (311), the service monitor (310) will transfer the print job from the local linked folder (311) to the print server (105).

Figure 4:
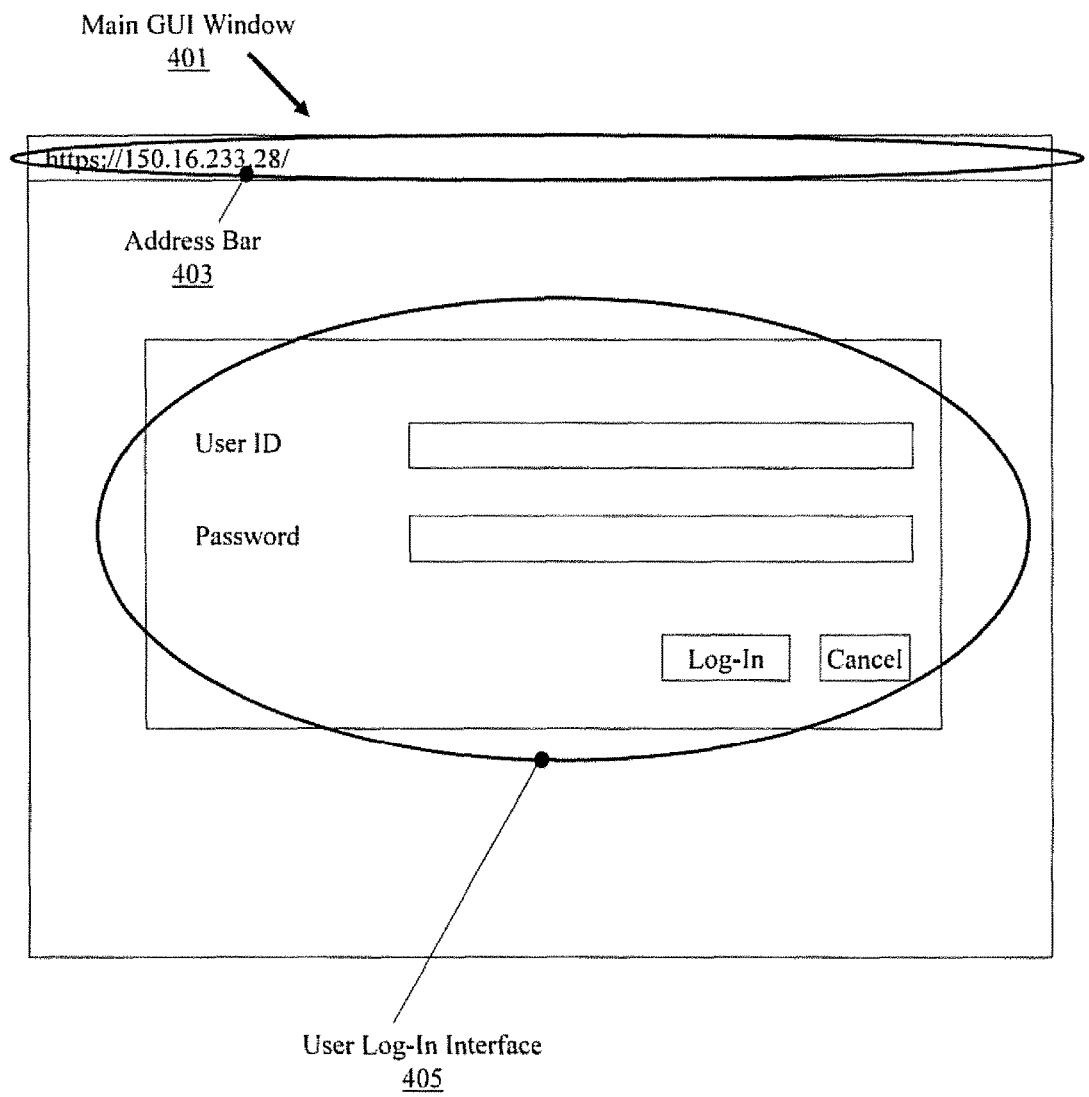
FIG. 4 shows a user interface in accordance with one or more embodiments of the invention.

FIG. 4 shows an example of a main GUI window (401) that is presented to the user through the display (305) of the user computing device (300). In one or more embodiments, the main GUI window (401) may be any web-browser application.

In one or more embodiments as shown in FIG. 4, the main GUI window (401) includes an address bar. When an Internet Protocol (IP) address or Uniform resource locator (URL) associated with the print server is entered into the address bar (403), a user log-in interface (405) is displayed through the main GUI window (401). The user is prompted to enter an authorized User-ID associated with the user and a Password set by the user to establish a connection between the user computing device (300) and the print server (105).

Figure 5:
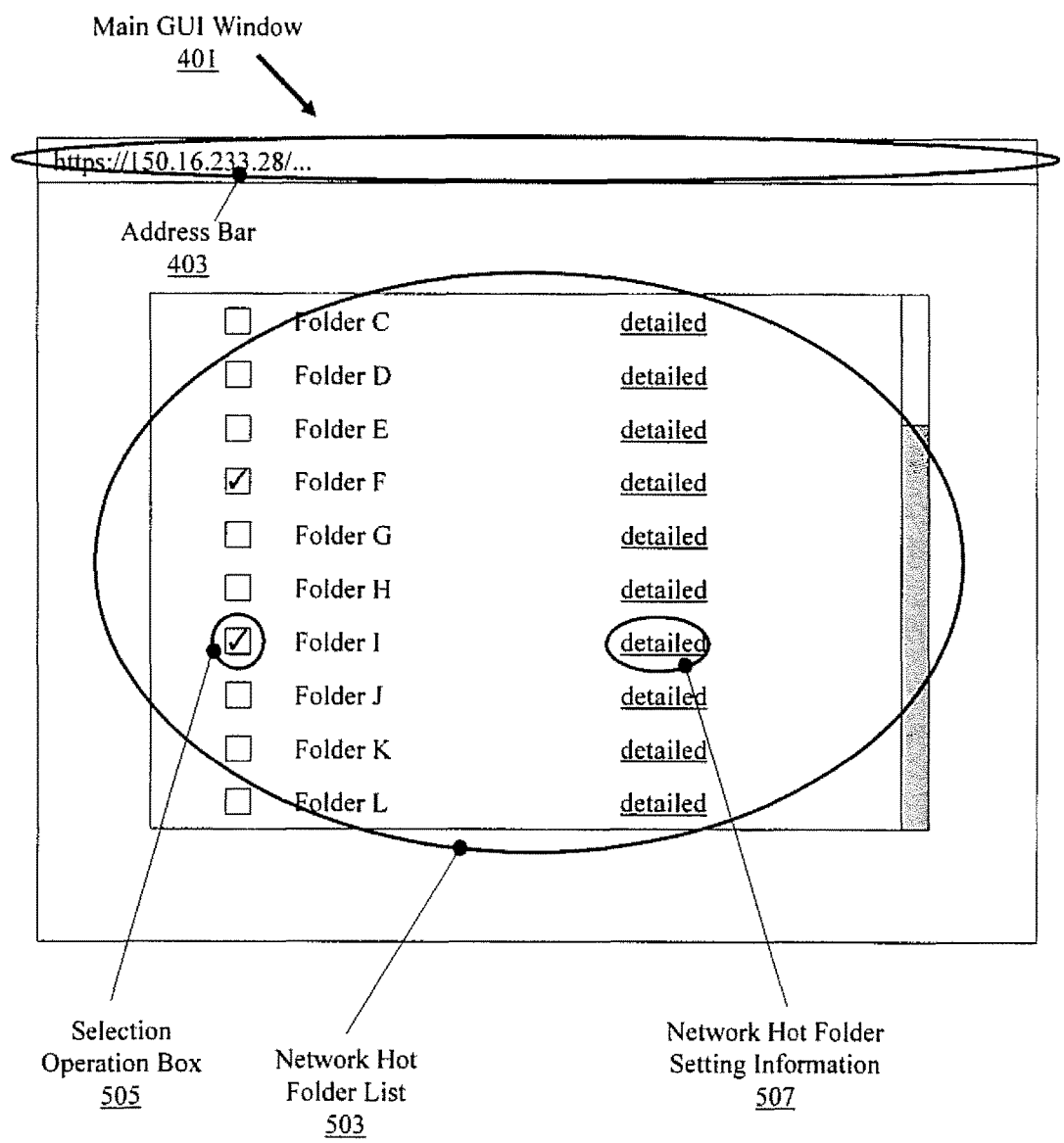
FIG. 5 shows a user interface in accordance with one or more embodiments of the invention.

FIG. 5 shows an example of the main GUI window (401) as discussed above in reference to FIG. 4 after a connection is established between the user computing device (300) and the print server (105).

In one or more embodiments as shown in FIG. 5, a network hot folder list (503) that includes all of the network hot folders (215) stored in the memory (209) of the print server (107) is presented on the main GUI window. The network hot folder list (203) further includes a selection operation box (505) for the user to select one or more of the available network hot folders (215) and a network hot folder setting information (507) that provides the user with all of the information with respect to the corresponding network hot folder (215).

In one or more embodiments, the information of the network hot folder (215) includes all of the attributes associated with the respective network hot folder (215) including the print functions and print processes that will be executed by the respective network hot folder (215).

Figure 6:
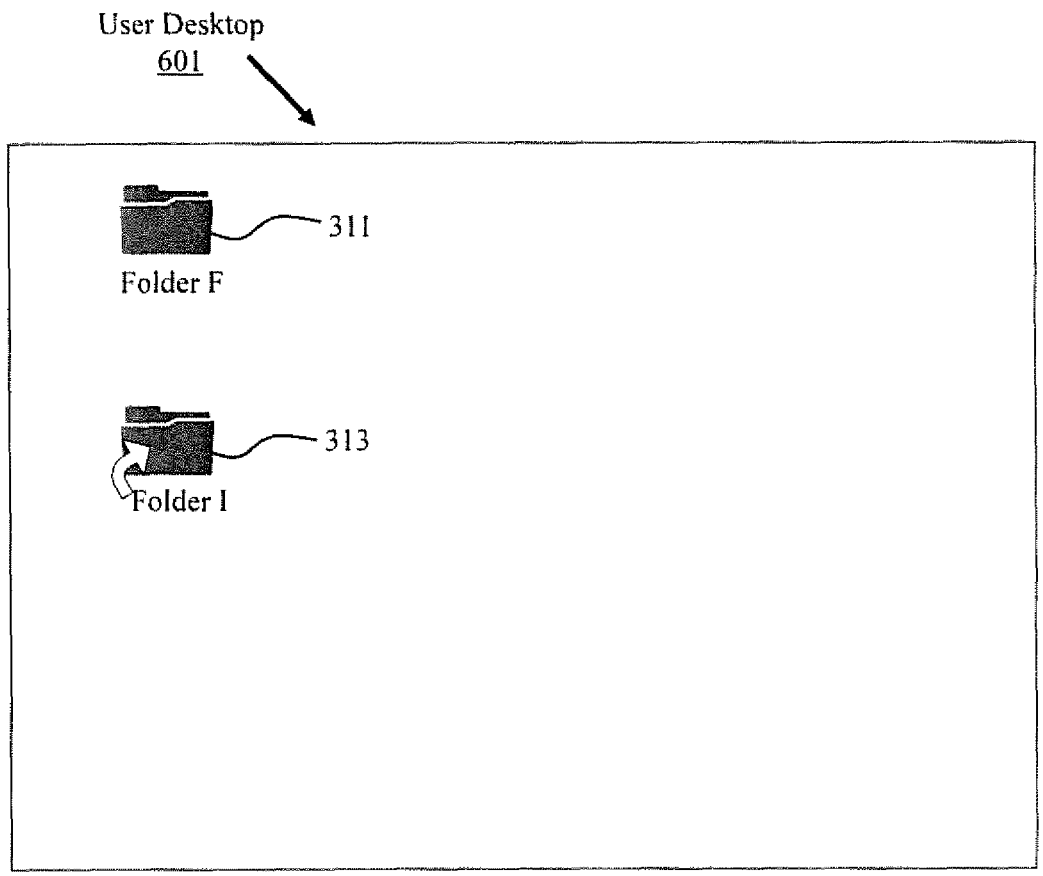
FIG. 6 shows a diagram in accordance with one or more embodiments of the invention.

In accordance with one or more embodiments, FIG. 6 shows a user desktop (601) as shown to a user of the user computing devices (107A-107D) through the display (305). As shown in FIG. 6, the user desktop (601) includes the two types of local hot folders: the local linked folder (311) and the network shortcut folder (313) as discussed above in reference to FIG. 3.

In one or more embodiments as shown in FIG. 6, the local linked folder (311) is illustrated as a conventional folder and the network shortcut folder (313) is illustrated as a conventional shortcut folder. Each of the local linked folder (311) and network shortcut folder (313) is created with a folder name that corresponds to the linked network hot folder (215). For example, the local linked folder (311) has a folder name "Folder F," and corresponds to the network "Hot Folder F," and the network shortcut folder (313) has a folder name "Folder I" and corresponds to the network "Hot Folder I."

Figure 7A:
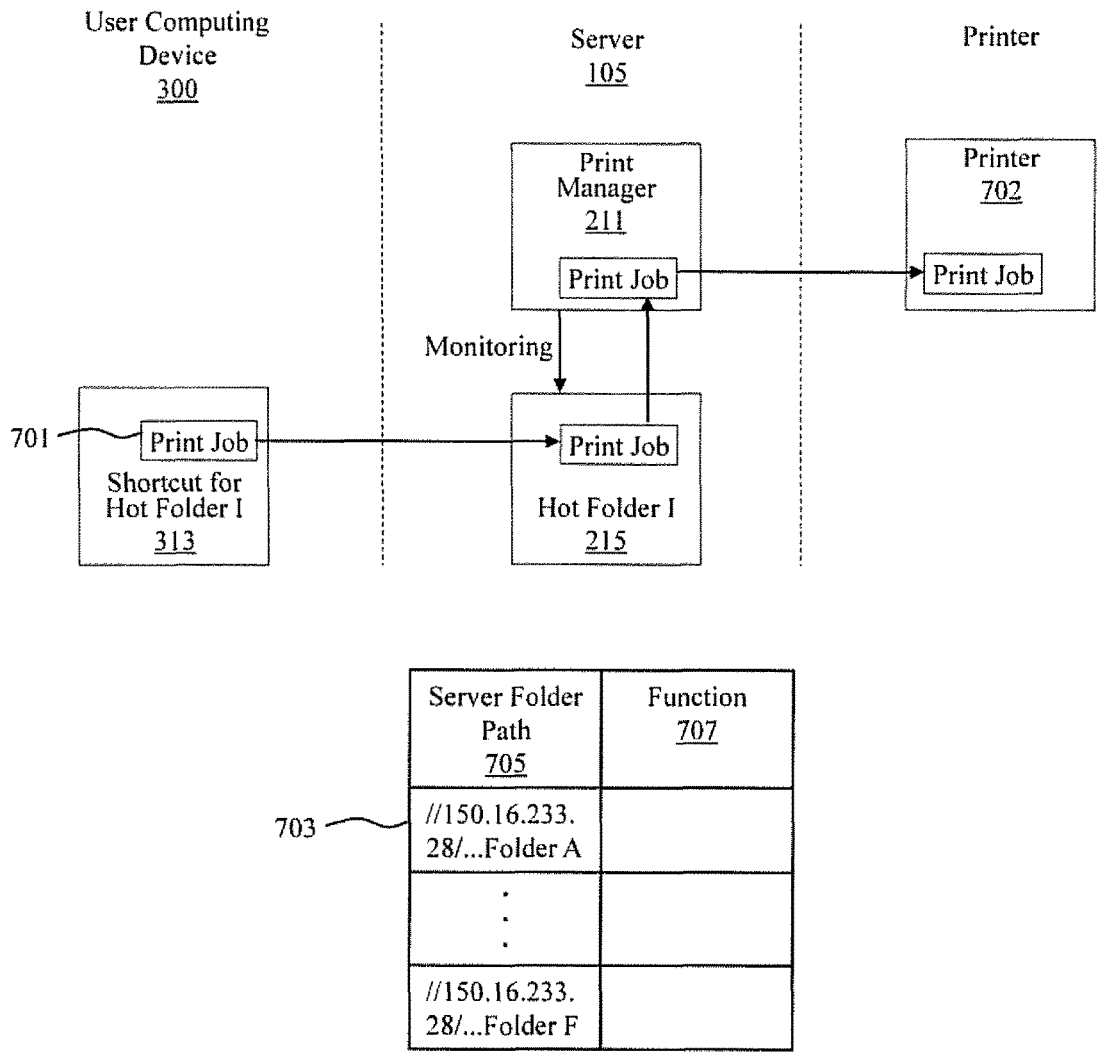
FIGS. 7A and 7B show diagrams in accordance with one or more embodiments of the invention.
Figure 7B:
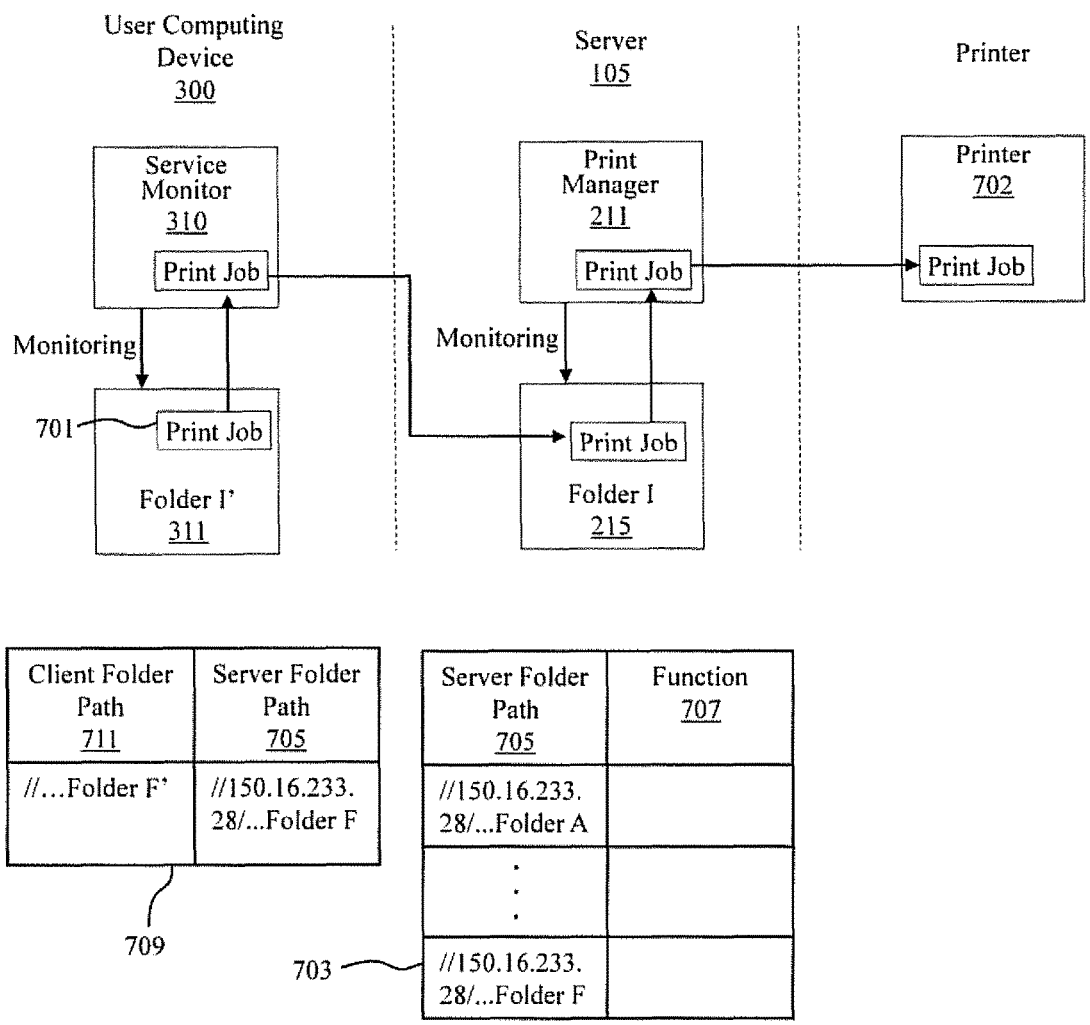

In accordance with one or more embodiments, FIGS. 7A and 7B show diagrams illustrating a first transfer protocol for transferring a print job (701) between the components of system (100) as discussed above in reference to FIGS. 1 to 3.

In one or more embodiments as shown in FIGS. 7A and 7B, the first transfer protocol involves passing the print job (701) through the respective network hot folder (215) as the print job is transferred from a local hot folder on the user computing device to the printer (702). In one or more embodiments the printer (702) may be any one of the printers (107A-107D) as discussed above in reference to FIG. 1.

In one or more embodiments as shown in FIGS. 7A and 7B, the local hot folders are configured as push-type hot folders that automatically send any print job (701) placed in the local hot folder directly or indirectly to the corresponding network hot folder on the print server (105).

In one or more embodiments, the print manager (211) sends instructions to the user computing device (300) to generate the local hot folder that implements the first transfer protocol. A local hot folder is determined by the print manager (211) to implement the first transfer protocol if the print manager determines that the corresponding network hot folder (215) is associated with or executes a predetermined process. In one or more embodiments, the predetermined process may be any type of higher-level print process that requires the reformation of a print data in the print job (701) such as, but is not limited to, Variable Data Printing (VDP) preprocessing, a job ticket language conversion to convert the programming language in original print data to a format compatible with the print manger and printer (702), and workflow node processing where comments regarding the status of existing print jobs (701) in the workflow are added to the print data.

In one or more embodiments as shown in FIG. 7A, a print job (701) is placed in a local hot folder on the user computing device (300). As seen in FIG. 7A, the local hot folder is a network shortcut folder (313) for the "Hot Folder I" (network hot folder) (215). When the print job (701) is placed in the network shortcut folder (313), the first transfer protocol is implemented and the network shortcut folder (313) automatically sends (i.e., pushes) the print job (701) to the "Hot Folder I" (215).

In one or more embodiments, the print manager (211) constantly monitors the "Hot Folder I" (215). When the print manager (211) determines that the processed print job (701) is available in the "Hot Folder I" (215), the print manager instructs the "Hot Folder I" (215) to execute the respective predetermined processes that it is configured with on the print job (701) and send the processed print job (701) to the print manager (211). Once the print manager (211) receives the processed print job (701), the print manager (211) sends the processed print job (701) to be executed on the printer (702).

In one or more embodiments as shown in FIG. 7A, a table (703) that includes server folder path information (705) and function information (707) is stored in the memory (209) of the print server (105). The server folder path information (705) includes the path in the print server (105) for each network hot folder (215) stored in the print server (105). The function information (707) includes the processes associated with or to be executed by each of the network hot folders (215) stored in the print server (105). The information in the table (703) is used by the print manager (211) and workflow manger (213) to set the transfer paths of the print jobs (701), instruct the network hot folders (215) to perform the correct processes, and maintain a smooth workflow for the incoming print jobs (701) by properly allocating the available resources of the processor (201) and memory (209) of the print server (105).

In one or more embodiments as shown in FIG. 7B, a print job (701) is placed in a local hot folder on the user computing device (300). As seen in FIG. 7B, the local hot folder is a local linked folder (311), created as "Folder I'," for the "Hot Folder I" (network hot folder) (215). When the print job (701) is placed in the local linked folder (311), the first transfer protocol is implemented and the local linked folder (311) waits for the service monitor (310) on the user computing device (300) to fetch the print job (701) and send (i.e., push) the print job (701) to the Hot Folder I" (215).

In one or more embodiments, the print manager (211) constantly monitors the "Hot Folder I" (215). When the print manager (211) determines that the processed print job (701) is available in the "Hot Folder I" (215), the print manager instructs the "Hot Folder I" (215) to execute the respective predetermined processes that it is configured with on the print job (701) and send the processed print job (701) to the print manager (211). Once the print manager (211) receives the processed print job (701), the print manager (211) sends the processed print job (701) to be executed on the printer (702).

In one or more embodiments shown in FIG. 7B, in addition to the table (703), a table (709) including client folder path information (711) and the server folder path information (705) is stored in the memory (309) of the user computing device (300). The service monitor (310) uses the information stored in the data table (709) to set the transmission path between the user computing device (300) and the print server (105).

Figure 8A:
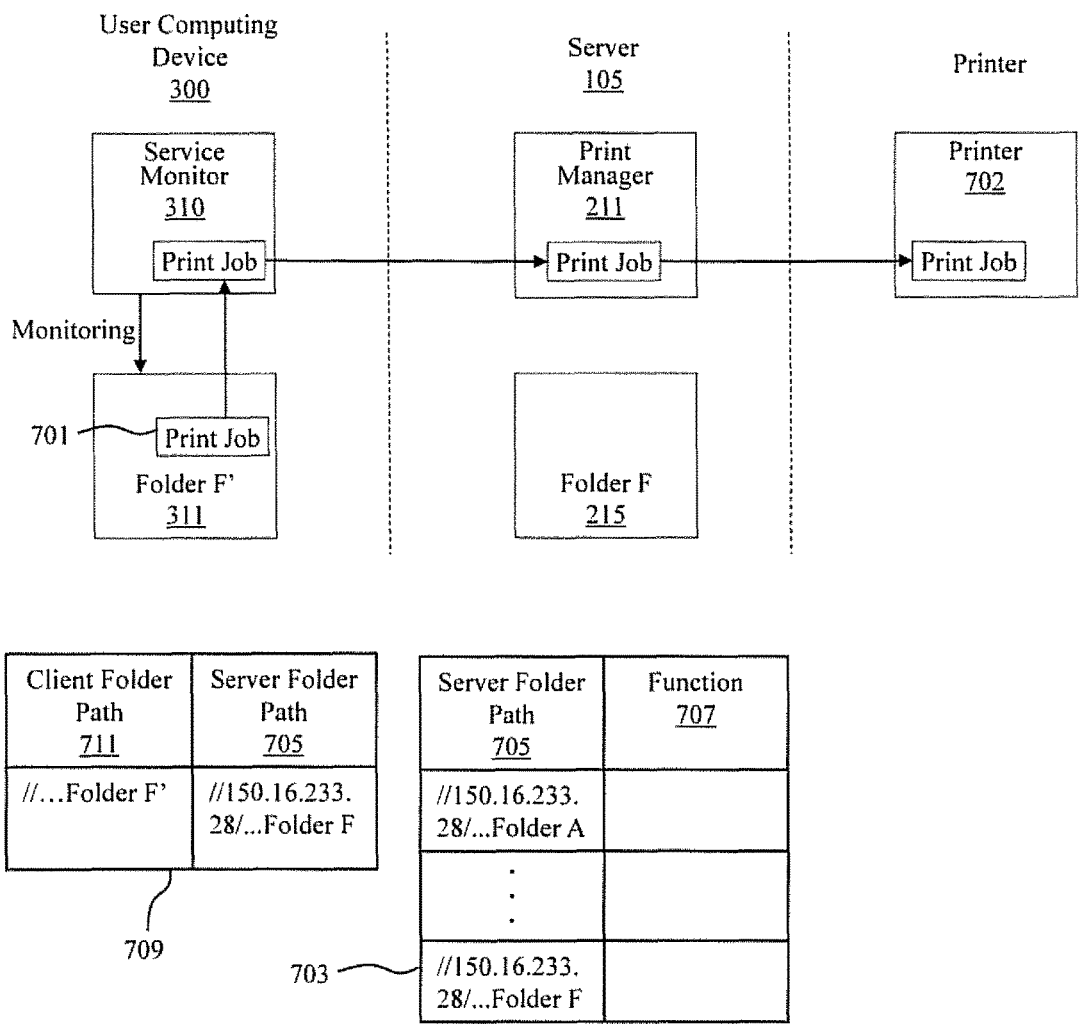
FIGS. 8A and 8B show diagrams in accordance with one or more embodiments of the invention.
Figure 8B:
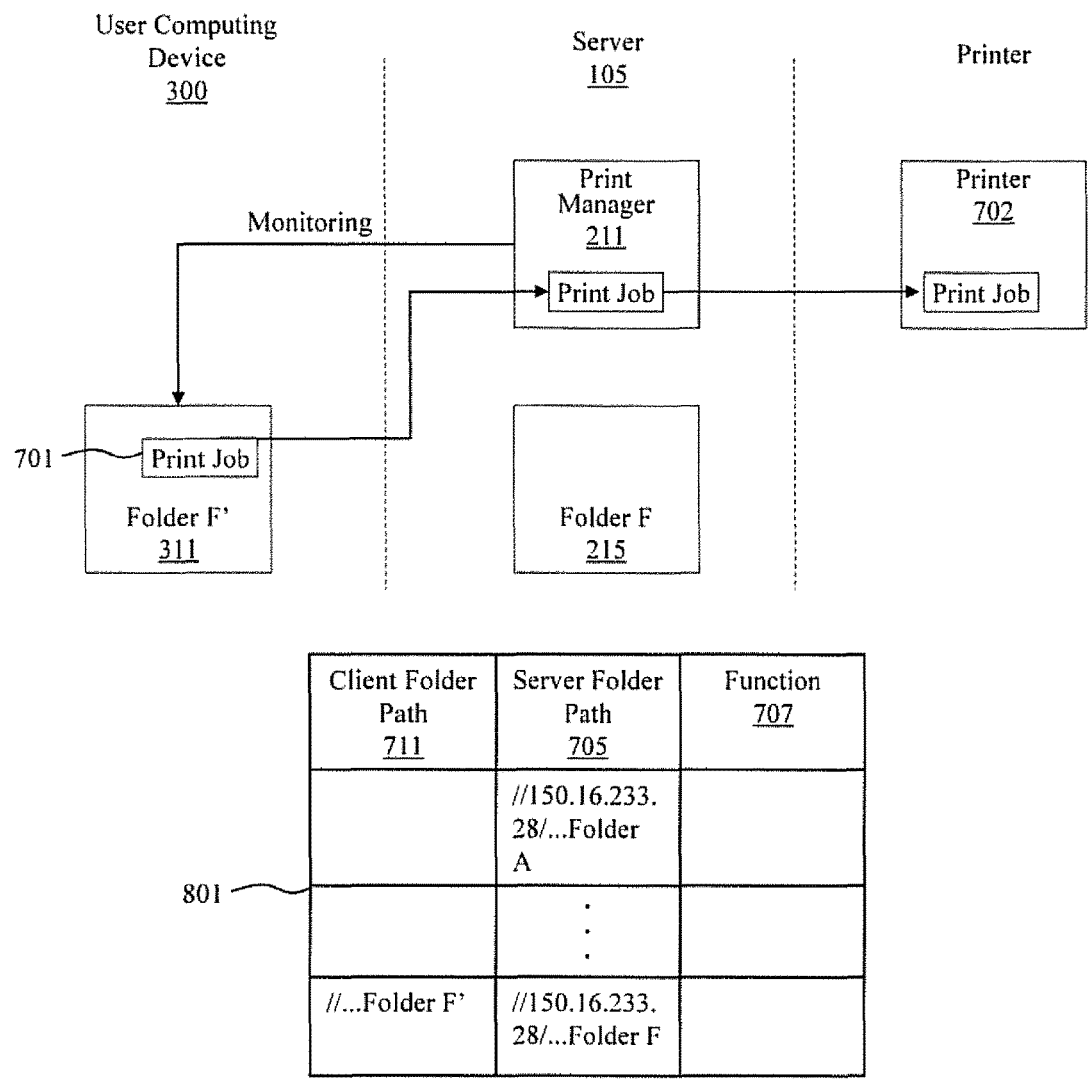

In accordance with one or more embodiments, FIGS. 8A and 8B show diagrams illustrating a second transfer protocol for transferring a print job (701) between the components of system (100) as discussed above in reference to FIGS. 1 to 3.

In one or more embodiments as shown in FIGS. 8A and 8B, the second transfer protocol involves transferring the print job (701) from the local hot folder on the user computing device (300) directly or indirectly to the print manager (211). In one or more embodiments, the print job (701) transferred using the second transfer protocol is transmitted by the printer manager (211) to the printer (702) without passing through the corresponding network hot holder (215) on the print server (105). In one or more embodiments the printer (702) may be any one of the printers (107A-107D) as discussed above in reference to FIG. 1.

In one or more embodiments as shown in FIGS. 8A and 8B, the local hot folders implementing the second transfer protocol are configured as push-type hot folders that send any print job (701) placed in the local hot folder directly or indirectly to the print manager (211) on the print server (105) without going through the corresponding network hot folder. Alternatively, the local hot folders implementing the second transfer protocol are configured as pull-type hot folders that wait from the print jobs (701) stored in the local hot folders to be fetched (i.e., retrieved) by the print manger (211) without going through the corresponding network hot folder.

In one or more embodiments, the print manager (211) sends instructions to the user computing device (300) to generate the push-type or pull-type local hot folder that implements the second transfer protocol. A local hot folder is determined by the print manager (211) to implement the second transfer protocol if the print manager determines that the corresponding network hot folder (215) is associated with or executes processes other than the predetermined process as discussed above in reference with FIGS. 7A and 7B.

In one or more embodiments, a local hot folder is determined to be created as a push-type hot folder if the user computing device (300) is permitted to send files on the network (101) to external devices or if network settings of the user computing device (300) does not permit the print server (105) to fetch files from the user computing device (300). Alternatively, a local hot folder is determined to be created as a pull-type hot folder if the user computing device (300) is not permitted to send files on the network (101) to external devices or if the network settings of the user computing device (300) permits the print server (105) to fetch files from the user computing device (300).

In one or more embodiments as shown in FIG. 5A, a print job (701) is placed in a local hot folder on the user computing device (300). The local hot folder on the user computing device (300) is created as a push-type hot folder that implements the second transfer protocol. As seen in FIG. 8A, the local hot folder is a local linked folder (311), created as "Folder F'," for the "Hot Folder F" (network hot folder) (215). When the print job (701) is placed in the local linked folder (311), the second transfer protocol is implemented and the local linked folder (311) waits for the service monitor (310) on the user computing device (300) to fetch the print job (701) and send (i.e., pushes) the print job (701) to the print manager (211). Once the print manager (211) receives the print job (701), the print manager (211) sends the print job (701) to be executed on the printer (702).

In one or more embodiments as shown in FIG. SA, table (703) and table (709) as discussed above in reference to FIGS. 7A and 7B are stored in the respective memories of the user computing device (300) and the print server (105).

In one or more embodiments as shown in FIG. 8B, the print job (313) is placed in a local hot folder on the user computing device (300). The local hot folder on the user computing device (300) is created as a pull-type hot folder that implements the second transfer protocol. As seen in FIG. 8B, the local hot folder is a local linked folder (311), created as "Folder F'," for the "Hot Folder F" (network hot folder) (215). When the print job (701) is placed in the local linked folder (311), the second transfer protocol is implemented and the local linked folder (311) waits for the print manager (211) on the print server (105) to fetch the print job (701) from the user computing device (300) to the print server (105). Once the print manager (211) retrieves the print job (701), the print manager (211) sends the print job (701) to be executed on the printer (702).

In one or more embodiments as shown in FIG. 8B, a data table (801) is stored in the memory (209) of the print server (105). The data table (801) includes the server folder path information (705), the function information (707), and the client folder path (711) as discussed above in reference to FIGS. 7A and 7B. The print manager (211) and the workflow manager (213) uses the information stored in the data table (801) to correctly retrieve the print job (701) from the respective local hot folder on the user computing device (300).

Figure 9:
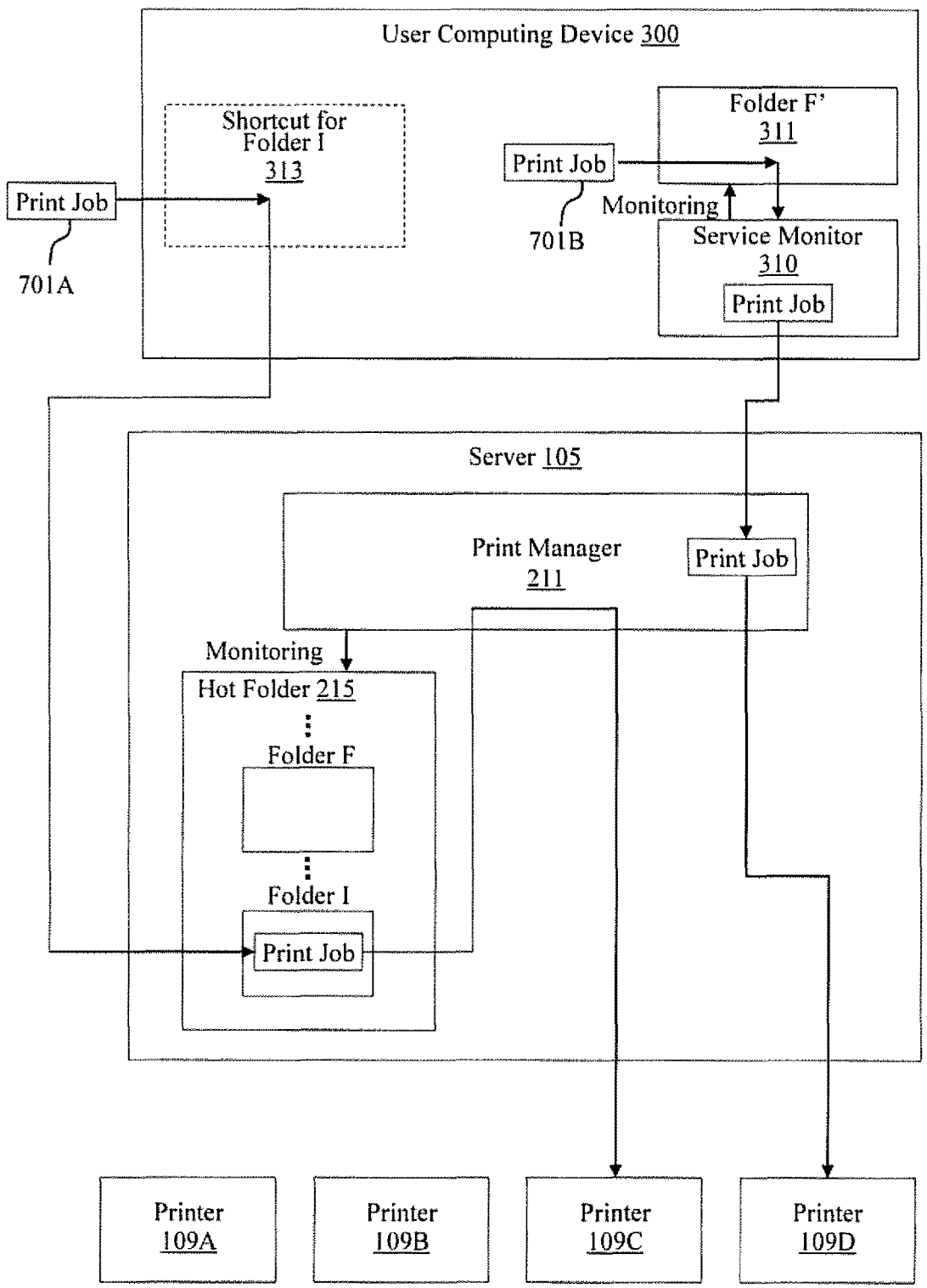
FIG. 9 shows a combined diagram of the diagrams of FIGS. 7A and 8A in accordance with one or more embodiments of the invention.

FIG. 9 shows a side-by-side comparison of the first transfer protocol and the second transfer protocol in accordance with one or more embodiments as discussed above in reference to FIG. 7A and FIG. 8A, respectively.

Figure 10A:
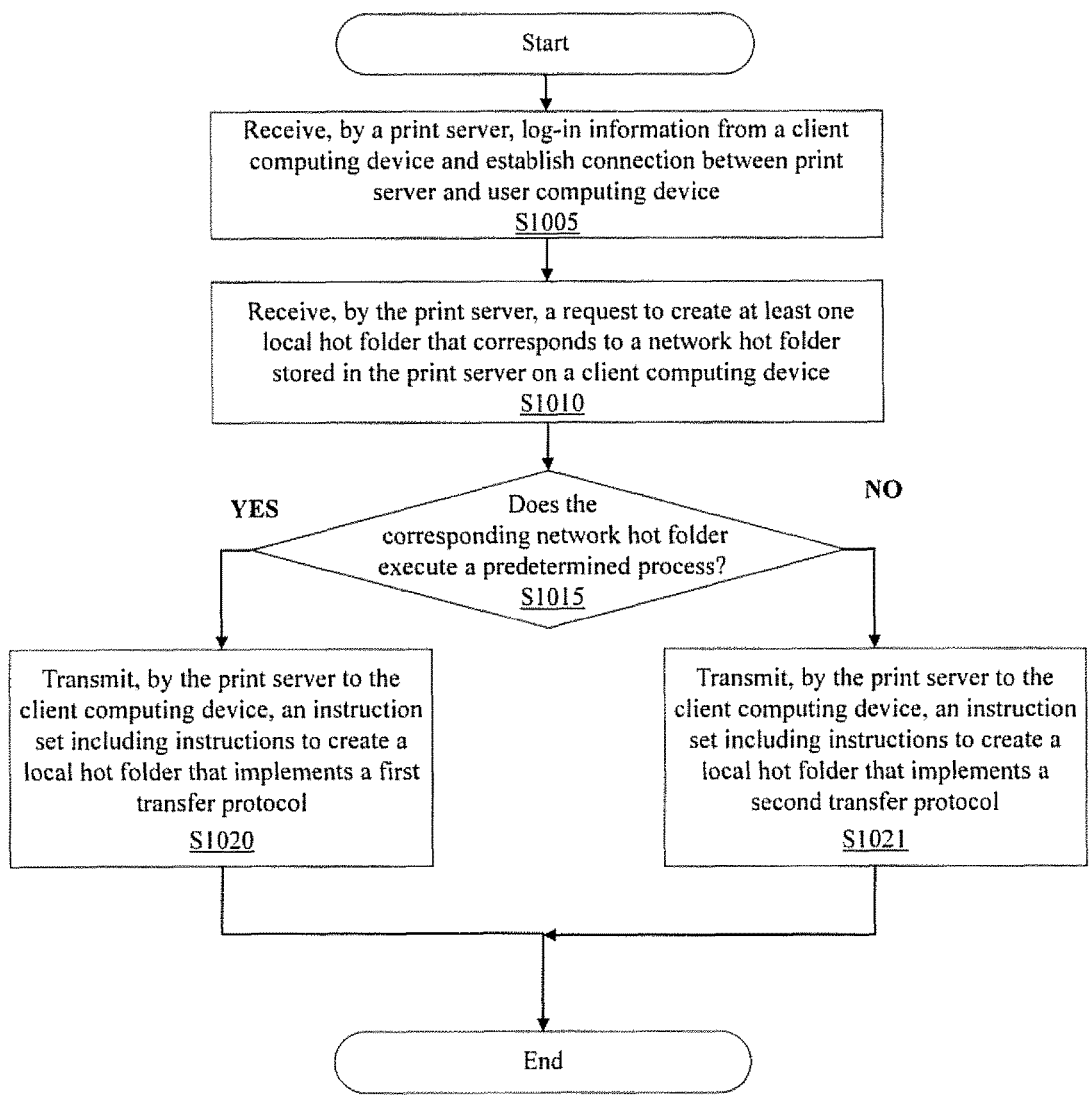
FIGS. 10A, 10B, and 10C show flow charts in accordance with one or more embodiments of the invention.
Figure 10B:
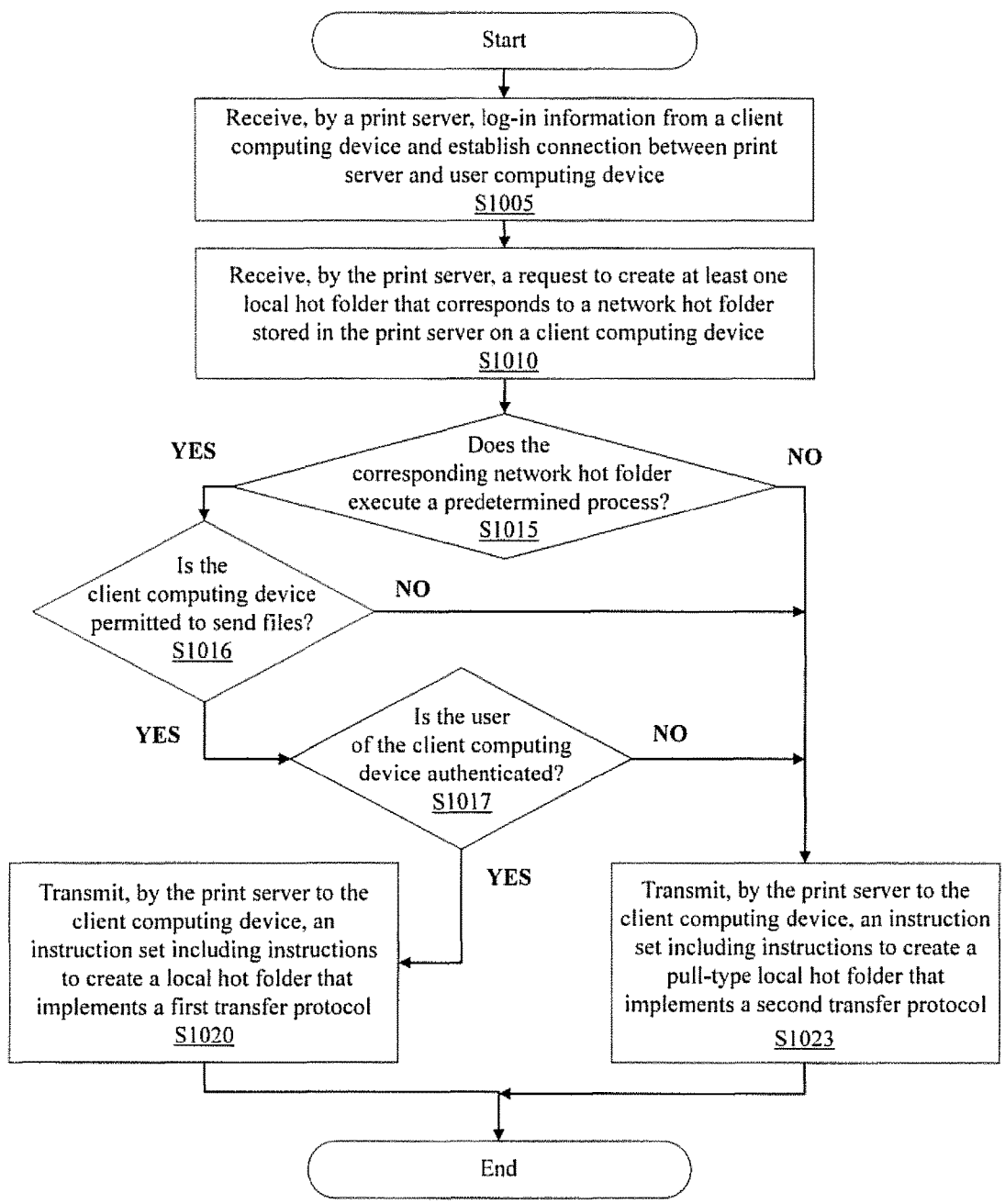
Figure 10C:
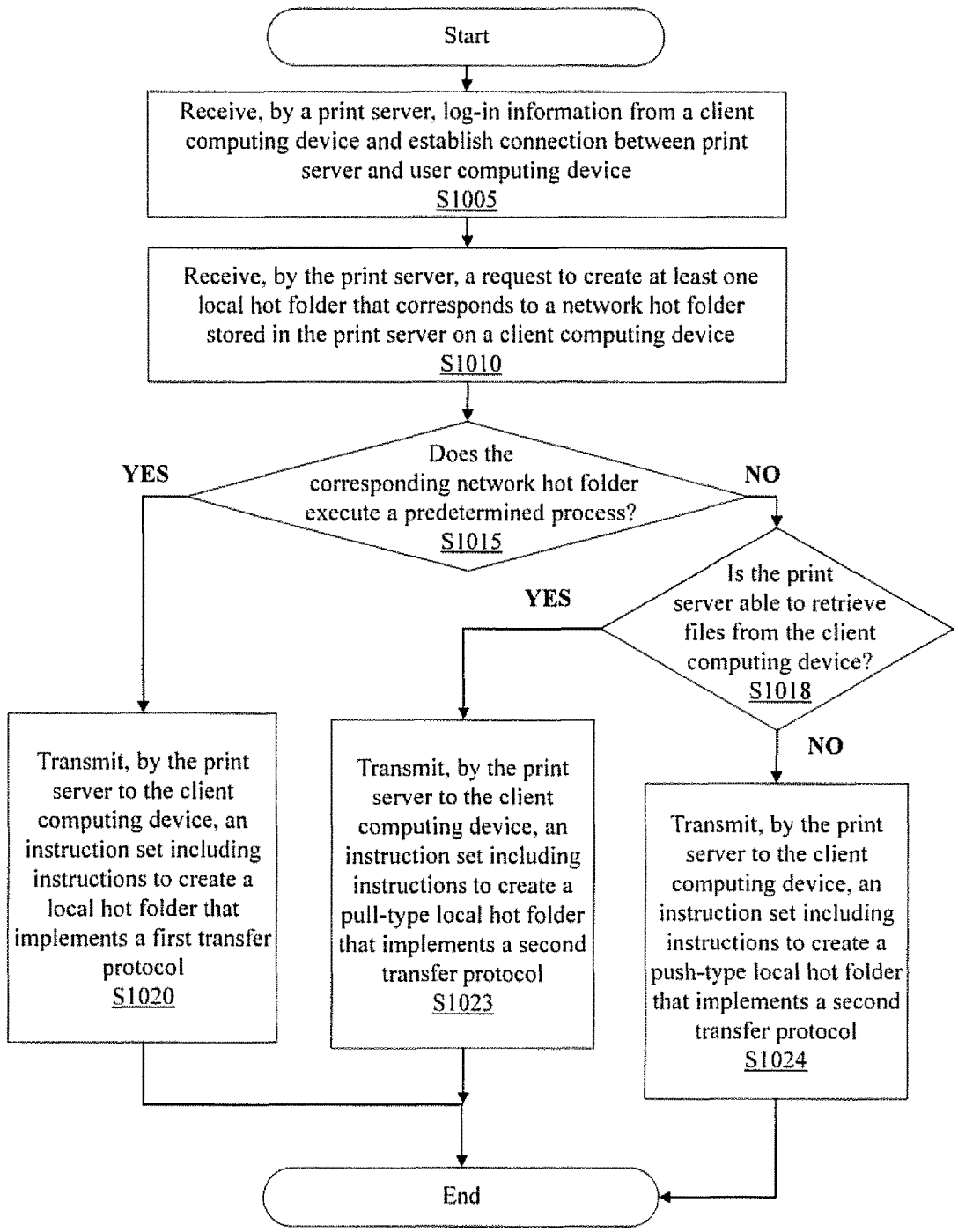

FIGS. 10A, 10B, and 10C are flowcharts in accordance with one or more embodiments that depict a process for automatically creating a local hot folder. One or more of the steps in FIGS. 10A, 10B, and 10C may be performed by the components of the system (100), discussed above in reference to FIG. 1. In one or more embodiments of the invention, one or more of the steps shown in FIGS. 10A, 10B, and 10C may be omitted, repeated, and/or performed in a different order than the order shown in FIGS. 10A, 10B, and 10C. Accordingly, the scope of the invention should not be considered limited to the specific arrangement of steps shown in FIGS. 10A, 10B, and 10C.

In one or more embodiments as shown in FIGS. 10A, 10B, and 10C, in Step S1005, the print server receives log-in information from the user computing device that includes the authorized User ID and the user-set Password as discussed above in reference to FIG. 4, and a connection between the print server and the user computing device is established.

In Step S1010, the print server receives a request from the user computing device to create at least one local hot folder that corresponds to a network hot folder stored in the print server on the user computing device. In one or more embodiment, the number of local hot folders to be created within the request is determined by the need of the user. The request includes network hot folders selected by the user from among the network hot folders presented in the network hot folder list as discussed above in reference to FIG. 5.

In Step S1015, the print server determines whether the network hot folder that corresponds to the local hot folder to be created executes a predetermined process. The predetermined process is discussed above in reference to FIGS. 7A and 7B.

Turning to FIG. 10A, in one or more embodiments, if the result of the determination in Step S1015 is YES, the print server transmits in Step S1020 an instruction set that includes instructions to create a local hot folder on the user computing device that implements a first transfer protocol. The first transfer protocol is discussed above in reference to FIGS. 7A and 7B.

Further, in one or more embodiments as shown in FIG. 10A, if the result of the determination in Step S1015 is NO, the print server transmits in Step S1021 an instruction set that includes instructions to create a local hot folder on the user computing device that implements a second transfer protocol. The second transfer protocol is discussed above in reference to FIGS. 8A and 8B.

Turning to FIG. 10B, in one or more embodiments, if the result of the determination in Step S1015 is YES, the print server will determine in Step S1016 whether the user computing device is permitted to send files over the network to an external device.

Further, if the result of the determination in Step S1016 is YES, the print server determines in Step S1017 by checking the log-in information received in Step S1005 if the logged-in user is an authenticated user that is permitted to send files to the print server.

Further still, if the result of the determination in Step S1017 is Yes, the process proceeds to Step S1020 as discussed above in reference to FIG. 10A.

Still referring to FIG. 10B, in one or more embodiments, if the result of the determination in either Step S1016 or Step S1017 is NO, the print server transmits in Step S1023 an instruction set that includes instructions to create a pull-type local hot folder on the user computing device that implements a second transfer protocol. The pull-type hot folder and the second transfer protocol are discussed above in reference to FIGS. 8A and 8B.

Turning now to FIG. 10C, in one or more embodiments, if the result of the determination in Step S1015 is NO, the print server determines in Step S1018 whether the print server is able to retrieve files from the user computing device. In one or more embodiments, network settings of the user computing device may not permit the print server to retrieve files from the user computing device. For example, the print server may include a public IP address and can be accessed by anyone with an authorized log-in information. However, the user computing device may include a private IP address and cannot be accessed by users of external devices. In this case, the print server would not be able to access the user computing device to retrieve a file (e.g., print job) from the user computing device.

Further, if the result of the determination in Step S1018 is YES, the process proceeds to Step S1023 as discussed above in reference to FIG. 10B.

Further still, if the result of the determination in Step S1018 is NO, the print server transmits in Step S1024, an instruction set that includes instructions to create a push-type local hot folder on the user computing device that implements a second transfer protocol. The push-type hot folder and the second transfer protocol are discussed above in reference to FIGS. 8A and 8B.

In accordance with one or more embodiments, the steps S1015 through S1024 as shown in FIGS. 10A, 10B, and 10C are repeated by the print server until all of the local hot folders for the selected network hot folders within the request received in Step S1010 have been created on the user computing device.

Various embodiments of the invention may have one or more of the following advantages: the ability to automatically create local hot folders on a user computing device through instructions sent from a print server based on a request by the user; the ability to automatically determine, by the print server, the most efficient transfer method (i.e., transfer protocol) for a local hot folder to be created on a user computing device based on the processes associated with or to be executed by the corresponding network hot folder; the ability to automatically determine, by the print server, if a print job can be pushed from the user computing device to the server or is required to be pulled from the user computing device by the print server based on internal settings of the user computing device and user authentication conditions; etc.

Figure 11:
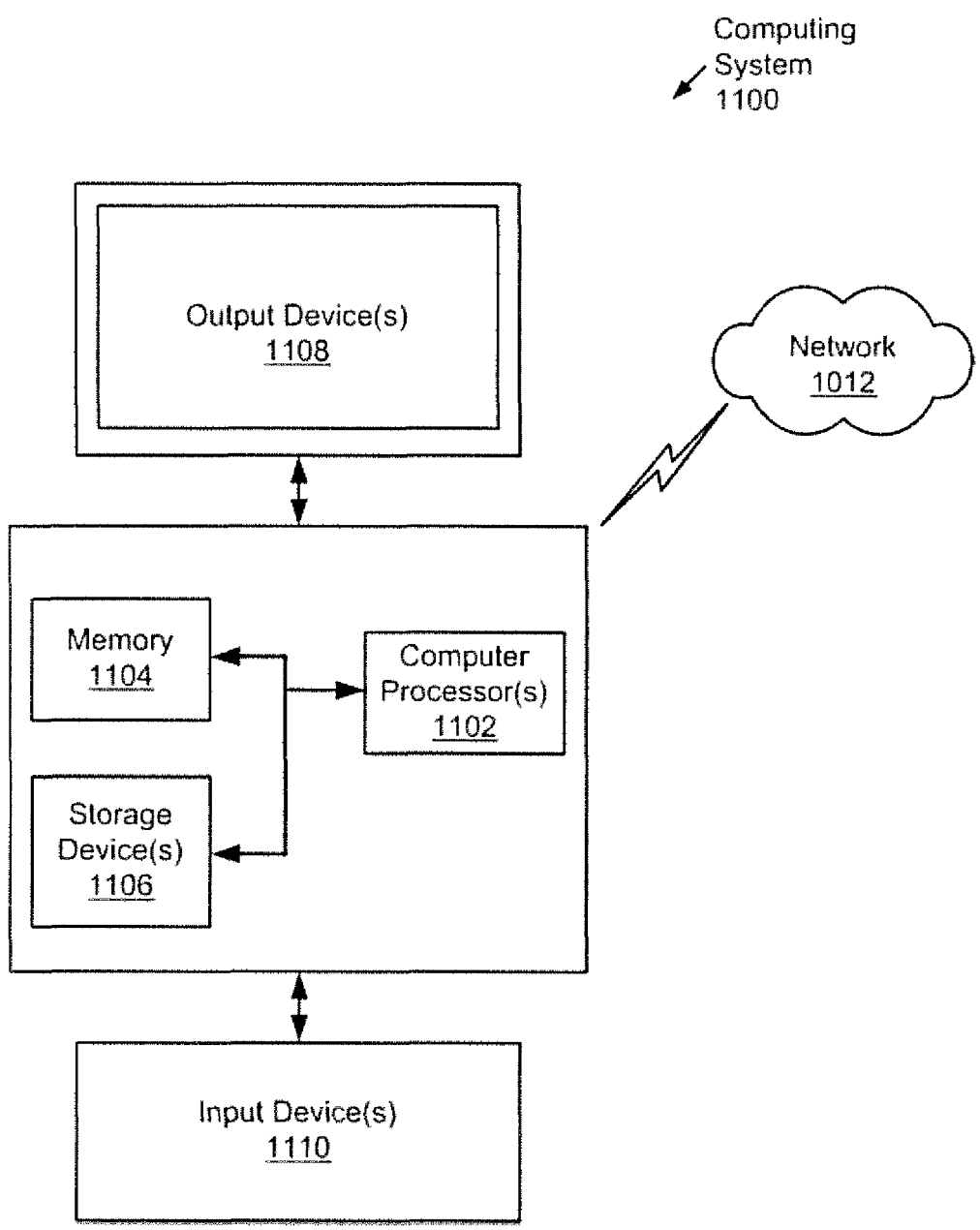
FIG. 11 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 11, the computing system (1100) may include one or more computer processor(s) (1102), associated memory (1104) (e.g., random access memory (RAM), cache memory, flash memory, etc.), one or more storage device(s) (1106) (e.g., a hard disk, an optical drive such as a compact disk (CD) drive or digital versatile disk (DVD) drive, a flash memory stick, etc.), and numerous other elements and functionalities. The computer processor(s) (1102) may be an integrated circuit for processing instructions. For example, the computer processor(s) may be one or more cores, or micro-cores of a processor. The computing system (1100) may also include one or more input device(s) (1110), such as a touchscreen, keyboard, mouse, microphone, touchpad, electronic pen, or any other type of input device. Further, the computing system (1100) may include one or more output device(s) (1108), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (1100) may be connected to a network (1112) (e.g., a local area network (LAN), a wide area network (WAN) such as the Internet, mobile network, or any other type of network) via a network interface connection (not shown). The input and output device(s) may be locally or remotely (e.g., via the network (1112)) connected to the computer processor(s) (1102), memory (1104), and storage device(s) (1106). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (1100) may be located at a remote location and connected to the other elements over a network (1112). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for creating local hot folders, comprising:
receiving, by a print server comprising a first network hot folder and a second network hot folder, a request to create at least one local hot folder on a user computing device, wherein
the first network hot folder executes a predetermined process and requires a first transfer protocol in response to executing the predetermined process, and
the second network hot folder executes another process and requires a second transfer protocol;
determining, by the print server, that the request corresponds to the first network hot folder;
transmitting, by the print server to the user computing device, a first instruction set comprising an instruction to create a first local hot folder that implements the first transfer protocol;
determining, by the print server, that the request also corresponds to the second network hot folder;
transmitting, by the print server to the user computing device, a second instruction set comprising an instruction to create a second local hot folder that implements the second transfer protocol;
determining, by the print server, that the user computing device is only permitted to receive files; and
transmitting, by the print server to the user computing device in response to determining that the user computing device is only permitted to receive files, a first additional instruction in the second instruction set to create the second local hot folder as a pull-type hot folder.

2. The method according to claim 1, wherein the first local hot folder that implements the first transfer protocol sends an internally-stored print job to a print manger executed on the print server through the corresponding first network hot folder.

3. The method according to claim 2, wherein the print manager sends the print job to a printer.

4. The method according, to claim 1, wherein the second local hot folder that implements the second transfer protocol sends an internally-stored print job directly to a print manager executed on the print server.

5. The method according to claim 1, wherein the predetermined process is Variable Data Printing (VDP) preprocessing, a job ticket language conversion, and workflow node processing.

6. The method according to claim 1, wherein the user computing device includes a monitoring service application that determines whether a print job is present either in the first local hot folder or the second local hot folder.

7. The method according to claim 6, wherein, in response to determining that the print job is present in either the first local hot folder or the second local hot folder, the monitoring service application retrieves the print job from the first local hot folder or the second local hot folder and sends the print job from the user computing device to the print server.

8. The method according to claim 1, further comprising:
determining, by the print server, that the user computing device is permitted to send files and that a user of the user computing device is authenticated; and
transmitting, by the print server to the user computing device in response to determining that the user computing device is permitted to send files and that the user of the user computing device is authenticated, a second additional instruction in the first instruction set to create the first local hot folder as a push-type hot folder.

9. The method according to claim 8 wherein the push-type hot folder sends an internally-stored print job to the print server.

10. The method according to claim 1, further comprising:
determining, by the print server, that the user computing device permits the print server to fetch a print job from the user computing device;
transmitting, by the print server to the user computing device in response to determining that the user computing device permits the print server to fetch a print job from the user computing device, the first additional instruction in the second instruction set to create the second local hot folder as the pull-type hot folder.

11. The method according to claim 1, further comprising:
determining, by the print server, that the user computing device blocks the print server from fetching a print job from the user computing device;
transmitting, by the print server to the user computing device in response to determining that the user computing device blocks the print server from fetching a print job from the user computing device, a second additional instruction in the second instruction set to create the second local hot folder as a push-type hot folder.

12. The method according to claim 1, wherein the pull-type hot folder waits for the print sever to fetch an internally-stored print job.

13. A non-transitory computer-readable medium (CRM) storing instructions that causes a print server to perform an operation to create hot folders on a user computing device, the operation comprising:
receiving, by the print server, a request to create at least one local hot folder on the user computing device, wherein
the print server comprises a first network hot folder and a second network hot folder,
the first network hot folder executes a predetermined process and requires a first transfer protocol in response to executing the predetermined process, and
the second network hot folder executes another process and requires a second transfer protocol;
determining, by the print server, that the request corresponds to the first network hot folder;
transmitting, by the print server to the user computing device, a first instruction set comprising an instruction to create a first local hot folder that implements the first transfer protocol;
determining, by the print server, that the request also corresponds to the second network hot folder;
transmitting, by the print server to the user computing device, a second instruction set comprising an instruction to create a second local hot folder that implements the second transfer protocol;
determining, by the print server, that the user computing device is only permitted to receive files; and
transmitting, by the print server to the user computing device in response to determining that the user computing device is only permitted to receive files, an additional instruction in the second instruction set to create the second local hot folder as a pull-type hot folder.

14. The CRM according to claim 13, wherein
the first local hot folder that implements the first transfer protocol sends an internally-stored print job to a print manger executed on the print server through the corresponding first network hot folder, and
the second local hot folder that implements the second transfer protocol sends an internally-stored print job directly to a print manager executed on the print server.

15. A system for printing comprising:
a print server that comprises a processor coupled to a memory, wherein
the memory comprises a first network hot folder and a second network hot folder,
the first network hot folder executes a predetermined process and requires a first transfer protocol in response to executing the predetermined process, and
the second network hot folder executes another process and requires a second transfer protocol; and
a user computing device connected to the print server, wherein the print server:
receives, from the user computing device a request to create at least one local hot folder on the user computing device,
determines that the request corresponds to the first network hot folder,
transmits, to the user computing device, a first instruction set comprising an instruction to create a first local hot folder that implements the first transfer protocol,
determines that the request also corresponds to the second network hot folder;
transmits, to the user computing device, a second instruction set comprising an instruction to create a second local hot folder that implements the second transfer protocol;
determines that the user computing device is only permitted to receive files; and
transmits, to the user computing device in response to determining that the user computing device is only permitted to receive files, an additional instruction in the second instruction set to create the second local hot folder as a null-type hot folder.

16. The system according to claim 15, wherein
the first local hot folder that implements the first transfer protocol sends an internally-stored print job to a print manger executed on the print server through the corresponding first network hot folder, and
the second local hot folder that implements the second transfer protocol sends an internally-stored print job directly to a print manager executed on the print server.

* * * * *